United States Patent [19]

Law et al.

[11] Patent Number: 4,797,337
[45] Date of Patent: Jan. 10, 1989

[54] DISAZO PHOTOCONDUCTIVE IMAGING MEMBERS

[75] Inventors: Kock-Yee Law, Fairport; Ihor W. Tarnawskyj, Rochester, both of N.Y.

[73] Assignee: Xerox Corporation, Stamford, Conn.

[21] Appl. No.: 78,481

[22] Filed: Jul. 27, 1987

[51] Int. Cl.⁴ .............................................. G03G 5/06
[52] U.S. Cl. ...................................... 430/58; 430/72; 534/658
[58] Field of Search .................... 430/58, 72; 534/658

[56] References Cited

U.S. PATENT DOCUMENTS

| | | | |
|---|---|---|---|
| 3,574,181 | 4/1971 | Forter et al. | 260/152 |
| 4,299,896 | 11/1981 | Hashimoto et al. | 430/58 |
| 4,314,015 | 2/1982 | Hashimoto et al. | 430/58 |
| 4,327,168 | 4/1982 | Hashimoto | 430/57 |
| 4,390,608 | 6/1983 | Hashimoto et al. | 430/57 |
| 4,390,611 | 6/1983 | Ishikawa et al. | 430/59 |
| 4,400,455 | 8/1983 | Hashimoto et al. | 430/59 |
| 4,486,519 | 12/1984 | Sesaki | 430/58 |
| 4,486,522 | 12/1984 | Hashimoto | 430/79 |
| 4,551,404 | 11/1985 | Hiro et al. | 430/59 |
| 4,596,754 | 6/1986 | Tsutsui et al. | 430/58 |
| 4,618,672 | 10/1986 | Hashimoto | 534/658 |

FOREIGN PATENT DOCUMENTS

| | | |
|---|---|---|
| 5420736 | 7/1970 | Japan . |
| 58177955 | 4/1981 | Japan . |
| 60111247 | 3/1982 | Japan . |
| 60-64354 | 7/1986 | Japan . |

OTHER PUBLICATIONS

"Electrophotographic Sensitivity of Fluorenone Bisazo Pigments", M. Hashimoto, vol. 25, No. 3 (1986).

Primary Examiner—John L. Goodrow
Attorney, Agent, or Firm—Judith L. Byerick; E. O. Palazzo

[57] ABSTRACT

Photoconductive imaging members comprising a supporting substrate, a hole transport layer, and a photogenerating layer comprising disazo compounds selected from the group consisting of: I.

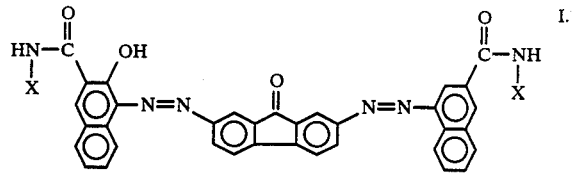

wherein X is selected from the group consisting of:

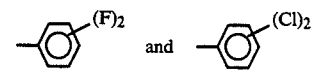

and

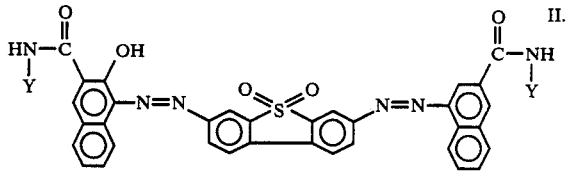

wherein Y is selected from the group consisting of:

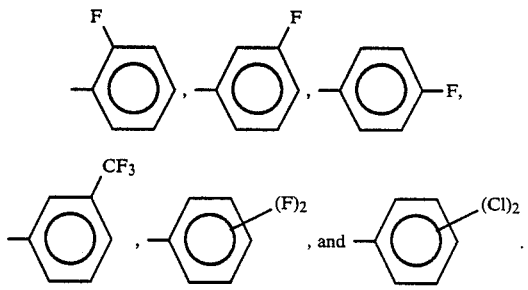

The photoconductive imaging members possess high cyclic stability, high photosensitivity, good dark development potential, low dark decay values, and excellent panchromaticity. They are non-toxic and may be made inexpensively, which renders them disposable.

42 Claims, 9 Drawing Sheets

Coupler Compounds

| Coupler | % Yield | m.p. (°C) | IR (cm-1) | M+ |
|---|---|---|---|---|
| 2-hydroxy-3-naphtho-3',5'-dichloroanilide | 53 | 226-230 | 1651 | 331 |
| 2-hydroxy-3-naphtho-2',5'-dichloroanilide | -- | | | 331 |
| 2-hydroxy-3-naphtho-2',4'-dichloroanilide | 87 | 231 | 1646 | 331 |
| 2-hydroxy-3-naphtho-3',4'-dichloroanilide | 80 | 268-270 | 1642 | 331 |
| 2-hydroxy-3-naphtho-2'-fluoroanilide | 85 | 220-221 | 1646 | 281 |
| 2-hydroxy-3-naphtho-3'-fluoroanilide | 60 | 222-223 | 1657 | 281 |
| 2-hydroxy-3-naphtho-4'-fluoroanilide | 74 | 264-265 | 1640 | 281 |
| 2-hydroxy-3-naphtho-2',3'-difluoroanilide | 69 | 263-264 | 1648 | 299 |
| 2-hydroxy-3-naphtho-3',5'-difluoroanilide | 69 | 263-265 | 1650 | 299 |
| 2-hydroxy-3-naphtho-2',5'-difluoroanilide | 61 | 257-258 | 1657 | 299 |
| 2-hydroxy-3-naphtho-2',4'-difluoroanilide | 61 | 245-246 | 1650 | 299 |
| 2-hydroxy-3-naphtho-3',4'-difluoroanilide | 94 | 262-263 | 1633 | 299 |
| 2-hydroxy-3-naphtho-3'-trifluoromethylanilide | 67 | 229-231 | 1642 | 311 |

FIG. 4

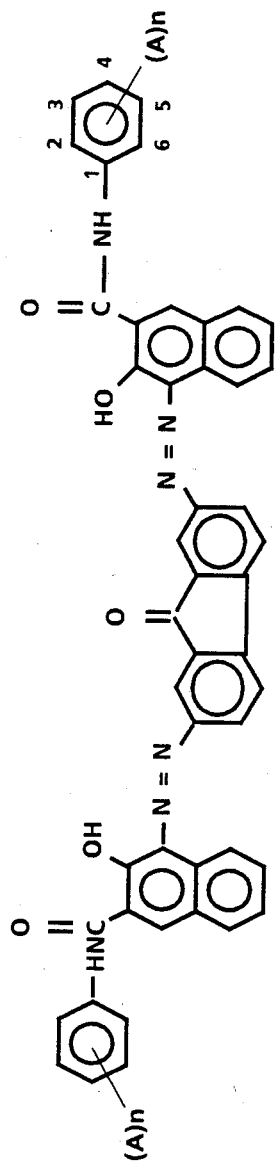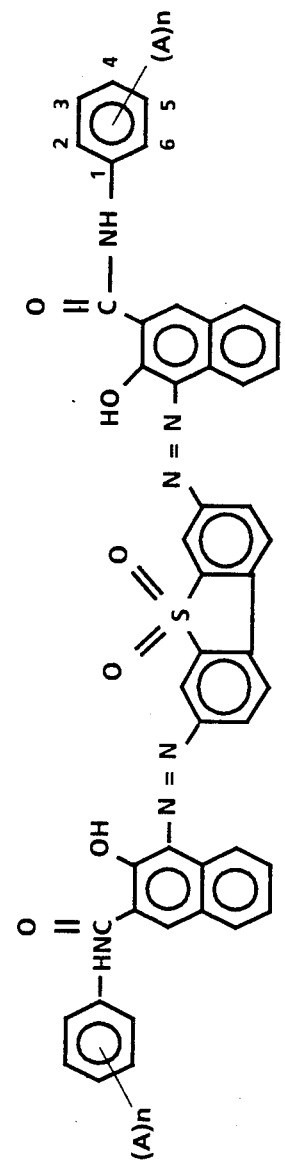
FIG. 5
Disazo Pigments of Formula I
Wherein A is the substituent in Figure 5A and n is the number of substituents
FIG. 6
Disazo Pigments of Formula II
Wherein A is the substituent in Figure 6A and 6B and n is the number of substituents

*Disazo Pigments of Formula I*

| Pigment | | | % Yield | m.p. (°C) | IR (cm⁻¹) | | Elemental Analysis | | |
|---|---|---|---|---|---|---|---|---|---|
| A | n | Position | | | | | C | H | N |
| Cl | 2 | 2,3 | 82 | >300 | 1678<br>1723 | calc'd:<br>found: | 62.96<br>62.73 | 2.92<br>3.21 | 9.37<br>8.96 |
| Cl | 2 | 3,5 | 87 | >300 | 1684<br>1722 | calc'd:<br>found: | 62.96<br>63.61 | 2.92<br>3.49 | 9.37<br>9.10 |
| Cl | 2 | 2,4 | 60 | >300 | 1680<br>1722 | calc'd:<br>found: | 62.96<br>63.73 | 2.96<br>3.16 | 9.37<br>9.16 |
| Cl | 2 | 2,5 | 82 | >300 | 1680<br>1722 | calc'd:<br>found: | 62.96<br>62.72 | 2.96<br>3.23 | 9.37<br>8.91 |
| Cl | 2 | 3,4 | 63 | >300 | 1679<br>1722 | calc'd:<br>found: | 62.96<br>62.22 | 2.92<br>3.22 | 9.37<br>9.06 |
| F | 2 | 2,3 | 82 | >300 | 1685<br>1722 | calc'd:<br>found: | 67.95<br>67.49 | 3.15<br>3.39 | 10.12<br>10.06 |
| F | 2 | 3,5 | 59 | >300 | 1685<br>1723 | calc'd:<br>found: | 67.95<br>66.63 | 3.15<br>3.35 | 10.12<br>9.96 |
| F | 2 | 2,4 | 67 | >300 | 1678<br>1723 | calc'd:<br>found: | 67.95<br>67.31 | 3.15<br>3.31 | 10.12<br>10.13 |
| F | 2 | 2,5 | 77 | >300 | 1679<br>1722 | calc'd:<br>found: | 67.95<br>67.13 | 3.15<br>3.48 | 10.12<br>9.82 |
| F | 2 | 3,4 | 70 | >300 | 1678<br>1722 | calc'd:<br>found: | 67.95<br>67.26 | 3.15<br>3.70 | 10.12<br>9.96 |

*FIG. 5A*

Disazo Pigments of Formula II

| Pigment | | | % Yield | m.p. (°C) | IR (cm⁻¹) | | Elemental Analysis | | |
| --- | --- | --- | --- | --- | --- | --- | --- | --- | --- |
| A | n | Position | | | | | C | H | N |
| F | 1 | 2 | 70 | >300 | 1678 | calc'd:<br>found: | 66.50<br>64.71 | 3.40<br>3.74 | 10.12<br>9.81 |
| F | 1 | 3 | 41 | >300 | 1680 | calc'd:<br>found: | 66.50<br>66.21 | 3.40<br>3.62 | 10.12<br>9.75 |
| F | 1 | 4 | 60 | >300 | 1673 | calc'd:<br>found: | 66.50<br>66.36 | 3.40<br>3.46 | 10.12<br>9.80 |
| F | 2 | 2,5 | 90 | >300 | 1684 | calc'd:<br>found: | 63.74<br>63.08 | 3.02<br>3.49 | 9.70<br>9.35 |
| F | 2 | 2,4 | 65 | >300 | 1680 | calc'd:<br>found: | 63.74<br>63.09 | 3.02<br>3.35 | 9.70<br>9.42 |
| F | 2 | 3,5 | 74 | >300 | 1685 | calc'd:<br>found: | 63.74<br>63.14 | 3.02<br>3.60 | 9.70<br>9.51 |
| F | 2 | 2,3 | 85 | >300 | 1685 | calc'd:<br>found: | 63.74<br>63.31 | 3.02<br>3.32 | 9.70<br>9.56 |
| F | 2 | 3,4 | 65 | >300 | 1679 | calc'd:<br>found: | 63.74<br>63.56 | 3.02<br>3.26 | 9.70<br>9.69 |
| Cl | 2 | 3,5 | 30 | >300 | 1678 | calc'd:<br>found: | 59.24<br>59.21 | 2.81<br>3.22 | 9.01<br>8.92 |

*FIG. 6A*

Disazo Pigments of Formula II

| Pigment | | | % Yield | m.p. (°C) | IR (cm$^{-1}$) | | Elemental Analysis | | |
|---|---|---|---|---|---|---|---|---|---|
| A | n | Position | | | | | C | H | N |
| Cl | 2 | 2,4 | 73 | >300 | 1681 | calc'd: found: | 59.24 58.58 | 2.81 3.31 | 9.01 8.79 |
| Cl | 2 | 3,4 | 75 | >300 | 1680 | calc'd: found: | 59.24 58.99 | 2.81 3.19 | 9.01 8.77 |
| Cl | 2 | 2,5 | 69 | >300 | 1682 | calc'd: found: | 59.24 58.61 | 2.81 2.67 | 9.01 8.91 |
| Cl | 2 | 2,3 | 82 | >300 | 1684 | calc'd: found: | 59.24 58.74 | 2.81 2.85 | 9.01 8.96 |
| CF$_3$ | 1 | 3 | 74 | >300 | 1683 | calc'd: found: | 61.94 62.06 | 3.03 3.35 | 9.03 8.79 |

FIG. 6B

| Compound | Corotron (kV) | $V_{ddp}$ (V) | Dark Decay (V/sec) | $V_R$ (V) | $E_{0.5ddp}$ (ergs/cm2) at 600 nm |
|---|---|---|---|---|---|
| 2,7-bis (1-azo-2'-hydroxy-3'-naphtho-2",5"-difluoroanilide) fluoren-9-one | -5.2 | -820 | -45 | -15 | 5.3 |
| 2,7-bis (1-azo-2'-hydroxy-3'-naphtho-2",4"-difluoroanilide) fluoren-9-one | -5.7 | -730 | -115 | -10 | 3.0 |
| 2,7-bis (1-azo-2'-hydroxy-3'-naphtho-2",3"-difluoroanilide) fluoren-9-one | -5.0 | -980 | -45 | -10 | 5.2 |
| 2,7-bis (1-azo-2'-hydroxy-3'-naphtho-2",3"-dichloroanilide) fluoren-9-one | -5.1 | -900 | -40 | -5 | 2.7 |
| 2,7-bis (1-azo-2'-hydroxy-3'-naphtho-3",5"-dichloroanilide) fluoren-9-one | -5.3 | -900 | -40 | -10 | 3.2 |
| 2,7-bis (1-azo-2'-hydroxy-3'-naphtho-2"-fluoroanilide) dibenzothiophene sulfone | -5.1 | -950 | -38 | -10 | 9.1 |
| 2,7-bis (1-azo-2'-hydroxy-3'-naphtho-3"-fluoroanilide) dibenzothiophene sulfone | -5.0 | -920 | -30 | -5 | 5.3 |

*FIG. 7A*

| Compound | Corotron (kV) | $V_{ddp}$ (V) | Dark Decay (V/sec) | $V_R$ (V) | $E_{0.5ddp}$ (ergs/cm2) at 600 nm |
|---|---|---|---|---|---|
| 2,7-bis (1-azo-2'-hydroxy-3'-naphtho-4''-fluoroanilide) dibenzothiophene sulfone | -5.6 | -910 | -55 | -15 | 4.6 |
| 2,7-bis (1-azo-2'-hydroxy-3'-naphtho-2'',5''-difluoroanilide) dibenzothiophene sulfone | -5.0 | -980 | -30 | -10 | 11.9 |
| 2,7-bis (1-azo-2'-hydroxy-3'-naphtho-2'',4''-difluoroanilide) dibenzothiophene sulfone | -5.0 | -950 | -20 | -5 | 10.9 |
| 2,7-bis (1-azo-2'-hydroxy-3'-naphtho-3'',5''-difluoroanilide) dibenzothiophene sulfone | -5.2 | -950 | -40 | -10 | 4.7 |
| 2,7-bis (1-azo-2'-hydroxy-3'-naphtho-3''-trifluoromethylanilide) dibenzothiophene sulfone | -5.0 | -980 | -10 | -10 | 11.2 |
| 2,7-bis (1-azo-2'-hydroxy-3'-naphtho-2'',4''-dichloroanilide) dibenzothiophene sulfone | -5.4 | -900 | -70 | -10 | 4.1 |
| 2,7-bis (1-azo-2'-hydroxy-3'-naphtho-2'',5''-dichloroanilide) dibenzothiophene sulfone | -5.3 | -940 | -80 | -10 | 4.8 |

*FIG. 7B*

Xerographic Properties of Disazo Pigments of Formulae I & II

| Compound | Binder | Corotron (kV) | $V_{ddp}$ (V) | Dark Decay (V/sec) | $V_R$ (V) | $E_{0.5ddp}$ (ergs/cm2) at 600 nm |
|---|---|---|---|---|---|---|
| 2,7-bis (1-azo-2'-hydroxy-3'-naphtho-2", 3"-dichloroanilide) fluoren-9-one | poly(vinyl butyral) hydroxy content 11% | -4.8 | -930 | -10 | -5 | 2.8 |
| 2,7-bis (1-azo-2'-hydroxy-3'-naphtho-2", 3"-dichloroanilide) fluoren-9-one | poly(vinyl butyral) hydroxy content 19% | -4.8 | -850 | -10 | -5 | 3.0 |
| 2,7-bis (1-azo-2'-hydroxy-3'-naphtho-2", 3"-dichloroanilide) fluoren-9-one | poly(vinyl butyral) (Aldrich) | -4.8 | -850 | -13 | -5 | 2.4 |
| 2,7-bis (1-azo-2'-hydroxy-3'-naphtho-2", 3"-dichloroanilide) fluoren-9-one | poly(vinyl butyral) hydroxy content 32% | -4.8 | -920 | -10 | -5 | 3.3 |
| 2,7-bis (1-azo-2'-hydroxy-3'-naphtho-3", 5"-dichloroanilide) fluoren-9-one | poly(vinyl butyral) hydroxy content 11% | -4.85 | -950 | -20 | -5 | 3.3 |
| 2,7-bis (1-azo-2'-hydroxy-3'-naphtho-3", 5"-difluoroanilide) dibenzothiophene sulfone | poly(vinyl butyral) hydroxy content 11% | -4.8 | -900 | -11 | -10 | 4.5 |

FIG. 8

DISAZO PHOTOCONDUCTIVE IMAGING MEMBERS

BACKGROUND OF THE INVENTION

This invention is directed to layered photoresponsive imaging devices which contain particular classes of disazo compounds. In one embodiment of the present invention there is provided a photoresponsive imaging member comprising a hole transport layer, and a photogenerating layer comprising various specific disazo compounds. These imaging members possess high photosensitivity, excellent panchromaticity, high cyclic stability, and other advantages illustrated herein. In addition, the imaging members are non-toxic and can be prepared by economical methods, thereby rendering them readily disposable. Also, the photoresponsive imaging members of the present invention are useful for various electrophotographic printing and imaging processes wherein latent images are formed on the imaging member, subsequently developed and transferred to a suitable substrate; and optionally permanently affixed thereto.

Xerographic photoconductive members are known, such as those consisting of a homogeneous layer of a single material including vitreous selenium, or composite layered devices containing a dispersion of a photoconductive composition. An example of one type of composite xerographic photoconductive members is described in U.S. Pat. No. 3,121,006, which discloses finely divided particles of a photoconductive inorganic compound dispersed in an electrically insulating organic resin binder. Imaging members prepared according to the teachings of this patent contain a binder layer with particles of zinc oxide uniformly dispersed therein, which layer is coated on a paper backing. The binders disclosed in this patent include materials such as polycarbonate resins, polyester resins, polyamide resins, and the like, which are incapable of transporting injected charge carriers generated by the photoconductive particles for any significant distance. Accordingly, the photoconductive particles must be in a substantially contiguous particle to particle contact throughout the layer for the purpose of permitting the charge dissipation required for a cyclic operation.

Photoreceptor materials comprising inorganic or organic materials wherein the charge generating and charge transport functions are accomplished by discrete contiguous layers are also known. Additionally, layered photoreceptor members are disclosed in the prior art, including photoreceptors having an overcoat layer of an electrically insulating polymeric material. Other layered photoresponsive devices have been disclosed, including those comprising separate photogenerating layers and charge transport layers as described in U.S. Pat. No. 4,265,990. Photoresponsive materials containing a hole injecting layer overcoated with a hole transport layer, followed by an overcoating of a photogenerating layer, and a top coating of an insulating organic resin, are disclosed in U.S. Pat. No. 4,251,612. Examples of photogenerating layers disclosed in these patents include trigonal selenium and phthalocyanines, while examples of transport layers include certain aryl diamines as illustrated therein. The disclosures of U.S. Pat. Nos. 4,265,990 and 4,251,612 are totally incorporated herein by reference.

Many other patents exist that describe layered members containing photogenerating substances, such as U.S. Pat. No. 3,041,167, which discloses an overcoated imaging member containing a conductive substrate, a photoconductive layer, and an overcoating layer of an electrically insulating polymeric material. This member can be selected for electrophotographic imaging processes by initially charging the member with an electrostatic charge of a first polarity, followed by exposing it to form an electrostatic latent image that can subsequently be developed to form a visible image.

Also, there are disclosed in U.S. Pat. No. 3,574,181 disazo compounds useful as coloring agents. Several of the compounds represented by the structures disclosed at, for example, column 1, lines 25 to 72, are similar to those of Formula II of the present invention, however, the compounds of the '181 reference include halogen substituents on the central aromatic groups; and further this patent does not describe structures having halogen substituents in the specific positions detailed for the disazo compounds of the present invention. The identities and positions of the halogen substituents on the terminal aromatic groups of the disazo compounds of the present invention provide photoconductive imaging members having superior xerographic properties such as high photosensitivity, good dark development potential, low dark decay values, and excellent panchromaticity.

Composite electrophotographic photosensitive materials containing various azo compounds are disclosed in U.S. Pat. No. 4,618,672, wherein bisazo compounds particularly suitable for use in the charge generating layer of a layered electrophotographic photoconductor are illustrated. Included in the teachings of this patent is a compound of the structure shown at, for example, column 1, lines 9 to 27, that is similar to that of the Formula I compounds of the present invention, but with no dihalogenation of the terminal phenyl groups, whereas all the compounds of Formula I of the present invention possess dihalogenated terminal phenyl groups. Similarly, an article by M. Hashimoto entitled "Electrophotographic Sensitivity of Fluorenone Bisazo Pigments," Electrophotography, Vol. 25, No. 3 (1986), discloses disazo compounds similar to those of Formula I as charge generating materials in electrophotographic layered photoreceptors. This article discusses a relationship between the electronegativity of substituents on the disazo compound and electrophotographic sensitivity. The compounds discussed in this reference, however, do not possess the dihalogenated terminal phenyl groups found in all of the Formula I compounds. Japanese Patent Kokai No. 54-20736 discloses disazo pigments as constituents in electrophotographic processes. Many disazo compounds are disclosed in the aforementioned reference, including those at, for example, pages 215 and 216, that have formulae similar to that of the compounds of Formula II of the present invention although the terminal phenyl groups do not contain the same substituents in the same positions. Japanese Pat. No. 58-177955 discloses many disazo compounds suitable for use in the photosensitive layer of an electrophotographic device, including some that are somewhat similar to those of the present invention.

Further, U.S. Pat. No. 4,390,611 discloses an electrophotographic photosensitive member with a photosensitive layer containing an azo pigment selected from a large class of compounds. Some of these compounds, including those disclosed at, for example, column 3, lines 10 to 20 and 55 to 70; column 4, lines 30 to 53; and column 6, lines 47 to 58, are similar to those of Formula II although none include therein terminal phenyl groups with fluorine or chlorine substituents at the sites indicated in Formulae I and II. Additionally, U.S. Pat. No. 4,551,404 at column 2, column 3 at lines 45 and 60 to 68, and columns 4 and 5, bridging paragraph; U.S. Pat. No. 4,596,754 at column 6, lines 25 and 65, and column 9, lines 1 to 19; and Japanese Pat. No. 60-64354 at pages 402 and 403, disclose electrophotographic devices containing azo compounds which resemble those of the present invention. Several additional references illustrate layered organic electrophotographic photoconductor elements with azo, bisazo, and related compounds, such as U.S. Pat. Nos. 4,400,455; 4,390,608; 4,327,168, 4,299,896; 4,314,015; 4,486,522; 4,486,519; and Japanese Patent Publication No. 60-111247. None of these references, however, discloses photoreceptors formulated with the specific disazo compounds disclosed herein and possessing all of the advantages of the members of the present invention.

Copending application U.S. Ser. No. 851,051, the disclosure of which is totally incorporated herein by reference, describes photoconductive imaging members containing a supporting substrate, azo pigments as photogenerating materials, and a hole transport layer preferably containing an aryl diamine compound dispersed in an inactive resinous binder. Imaging members containing disazo compounds closely related to those selected for the present invention are disclosed on page 6, and in FIGS. 3-7, 3-8, and 3-9 of this application. Copending application U.S. Ser. No. 851,066, the disclosure of which is hereby totally incorporated by reference, also discloses photoconductive imaging members containing a supporting substrate, certain azo pigments as photogenerating materials, and a hole transport layer that preferably contains an aryl diamine compound dispersed in an inactive resinous binder. The azo pigments used as photogenerating materials in this copending application, however, differ significantly from the azo compounds selected as photogenerating materials for the present invention.

Although photoconductive imaging members with disazo compounds are known, including those very similar to the disazo compounds of the present invention, a need remains for disposable photoconductor devices. There also continues to be a need for layered photoresponsive imaging members containing azo compounds that will generate high quality images, even after repeated use in many imaging cycles, without succumbing to deterioration from the machine environment or surrounding conditions. In addition, a continuing need exists for improved layered photoresponsive imaging members wherein the azo compounds selected for one of the layers are substantially inert to the users of such members. Also, an important need exists for inexpensive layered azo photoconductors of high cyclic stability, high photosensitivity, good dark development potential, low dark decay, and high panchromaticity.

SUMMARY OF THE INVENTION

It is an object of the present invention to provide layered photoresponsive imaging devices containing disazo compounds.

Another object of the present invention is to provide non-toxic, inexpensive, and disposable photoresponsive imaging devices.

It is yet another object of the present invention to provide photoresponsive imaging devices with high cyclic stability.

Additionally, another object of the present invention is to provide photoresponsive imaging devices which exhibit high photosensitivity.

Further, another object of the present invention resides in the provision of photoresponsive imaging devices with acceptable dark development potentials.

Also, another object of the present invention is to provide photoresponsive imaging devices which possess desirable low dark decay values.

It is still another object of the present invention to provide photoresponsive imaging devices having excellent panchromaticity.

Additionally, a further object of the present invention is to provide methods of imaging with the imaging members illustrated herein.

These and other objects of the invention are achieved by providing a photoconductive imaging member comprising a supporting substrate, a hole transport layer, and a photogenerating layer comprising diazo compounds selected from the group consisting of:

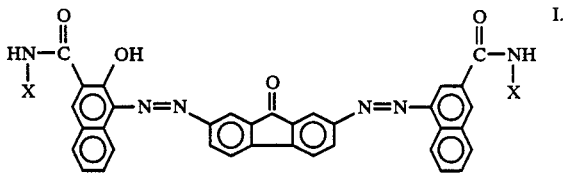

wherein X is selected from the group consisting of:

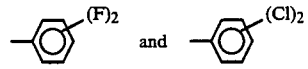

and

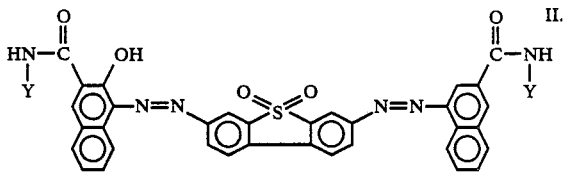

wherein Y is selected from the group consisting of:

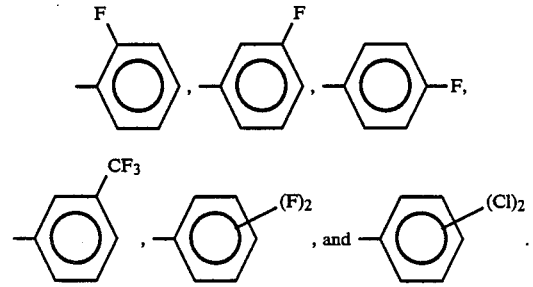

Formulae I and II encompass such as 2,7-bis(1'-azo-2'-hydroxy-3'-naphtho-2'',5'''-difluoroanilide)fluoren-9-one, 2,7-bis(1'-azo-2'-hydroxy-3'-naphtho-2'',4''-difluoroanilide)fluoren-9-one, 2,7-bis(1'-azo-2'-hydroxy-3'-naphtho-2'',3''-difluoroanilide)fluoren-9-one, 2,7-bis(1'-azo-2'-hydroxy-3'-naphtho-3'',5''-difluoroanilide)fluoren-9-one, 2,7-bis(1'-azo-2'- hydroxy-3'-naphtho-3",4"'-difluoroanilide)fluoren-9-one, 2,7-bis(1'-azo-2'-hydroxy-3'-naphtho-2",5"-dichloroanilide)fluoren-9-one, 2,7-bis(1'-azo-2'-hydroxy-3'-naphtho-2",4"-dichloroanilide)fluoren-9-one, 2,7-bis(1'-azo-2'-hydroxy-3'-naphtho-2",3"-dichloroanilide)fluoren-9-one, 2,7-bis(1'-azo-2'-hydroxy-3'-naphtho3",5"-dichloroanilide)fluoren-9-one, 2,7-bis(1'-azo-2'-hydroxy-3'-naphtho-3",4"-dichloroanilide)fluoren-9-one, 2,7-bis(1'-azo-2'-hydroxy-3'-naphtho-2"'-fluoroanilide)dibenzothiophene sulfone, 2,7-bis(1'-azo-2'-hydroxy-3'-naphtho-3"-fluoroanilide)dibenzothiophene sulfone, 2,7-bis(1'-azo-2'-hydroxy-3'-naphtho-4"'-fluoroanilide)dibenzothiophene sulfone, 2,7-bis(1'-azo-2'-hydroxy-3'-naphtho-2",5"-difluoroanilide)dibenzothiophene sulfone, 2,7-bis(1'-azo-2'-hydroxy-3'-naphtho-2",4"-difluoroanilide)dibenzothiophene sulfone, 2,7-bis(1'-azo-2'-hydroxy-3'-naphtho-2",3"-difluoroanilide)dibenzothiophene sulfone, 2,7-bis(1'-azo-2'-hydroxy-3'-naphtho-3",5"-difluoroanilide)dibenzothiophene sulfone, 2,7-bis(1'-azo-2'-hydroxy-3'-naphtho-3",4"-difluoroanilide)debenzothiophene sulfone, 2,7-bis(1'-azo-2'-hydroxy-3'-napto-2",5"-dichloroanilide)dibenzothiophene sulfone, 2,7-bis(1'-azo-2'-hydroxy-3'-naphtho-2",4"-dichloroanilide)dibenzothiophene sulfone, 2,7-bis(1'-azo-2'-hydroxy-3'-naphtho-2",3"-dichloroanilide)dibenzothiophene sulfone, 2,7-bis(1'-azo-2'-hydroxy-3'-naphtho-3",5"-dichloroanilide)dibenzothiophene sulfone, 2,7-bis(1'-azo-2'-hydroxy-3'-naphtho-3",4"-dichloroanilide)dibenzothiophene sulfone, and 2,7-bis(1'-azo-2'-hydroxy-3'-naphtho-3"-trifluoromethylanilide)dibenzothiophene sulfone. The aforementioned photogenerating azo compounds may be situated between a supporting substrate and a hole transport layer. Alternatively, the hole transport layer may be situated between the supporting substrate and the photogenerating azo compounds. Also, photoconductive imaging members of the present invention may contain a hole blocking layer and an adhesive interface layer as illustrated herein.

BRIEF DESCRIPTION OF THE DRAWINGS

For a better understanding of the features of the present invention, the following detailed description of various preferred embodiments is provided, wherein

FIG. 4 is a table listing the coupler compounds prepared in accordance with the procedure of Example I and certain measured characteristics of these compounds;

FIGS. 5 and 6 are formulae indicating, for example, the positions of substituents on compounds of Formulae I and II, and are presented to clarify the information in FIGS. 5A, 6A, and 6B;

FIGS. 5A, 6A, and 6B are tables indicating various characteristics of the compounds of Formulae I and II; and FIGS. 7A, 7B, and 8 are tables indicating the electrophotographic properties of imaging members that constitute embodiments of the present invention.

DESCRIPTION OF THE PREFERRED EMBODIMENTS

Preferred embodiments of the invention will now be illustrated, it being noted that equivalent compositions are also embraced within the scope of the present invention.

Figure 1:
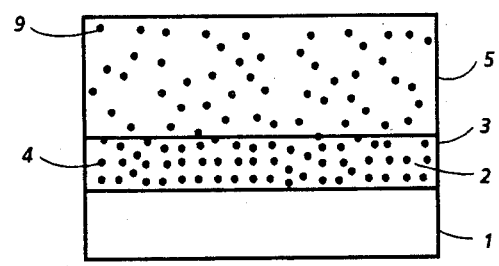
FIGS. 1, 2, and 3 are partially schematic cross-sectional views of the photoconductive imaging members of the present invention.

FIG. 1 illustrates a photoconductive imaging member of the present invention comprising a supporting substrate 1, a photogenerating layer 3 comprising an azo pigment 2 selected from the group consisting of those represented by Formulae I and II optionally dispersed in a resinous binder composition 4, and a charge carrier hole transport layer 5, which comprises a hole transporting molecule dispersed in an inactive resinous binder composition 9.

Figure 2:
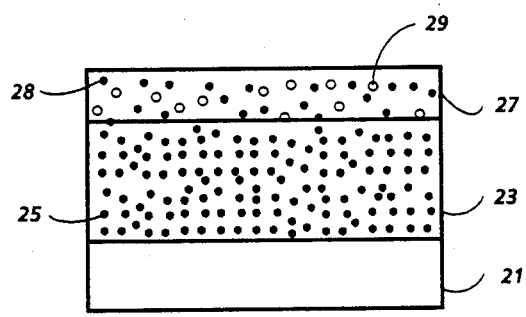

FIG. 2 illustrates essentially the same member as that shown in FIG. 1 with the exception that the hole transport layer is situated between the supporting substrate and the photogenerating layer. More specifically, this figure illustates a photoconductive imaging member comprising a supporting substrate 21, a hole transport layer 23 comprising a hole transport composition dispersed in an inactive resinous binder composition 25, and a photogenerating layer 27 of comprising an azo compound 28 selected from the group consisting of those compounds represented by Formulae I and II optionally dispersed in a resinous binder composition 29.

Figure 3:
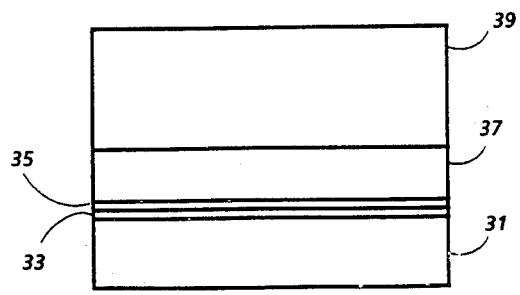

FIG. 3 illustrates a photoconductive imaging member of the present invention comprising a supporting substrate 31, a hole blocking metal oxide layer 33, an optional adhesive layer 35, an azo photogenerating layer 37 comprising an azo compound selected from the group consisting of 2,7-bis(1'-azo-2'-hydroxy-3'-naphtho-2",3"-dichloroanilide)fluoren-9-one, 2,7-bis(1'-azo-2'-hydroxy-3'-naphtho-3",5"-dichloroanilide)fluoren-9-one, and 2,7-bis(1'-azo-2'-hydroxy-3'-naphtho-2"'-fluoroanilide)dibenzothiophene sulfone; and an aryl amine charge carrier or hole transport layer 39. The photogenerating layer generally comprises the azo compound optionally dispersed in a resinous binder composition, and similarly the materials of the charge transport layer, such as aryl amines, are dispersed in inactive resinous binder materials.

FIG. 4 represents a tabulation of various characteristics of coupler compounds used to synthesize the diazo compounds of Formulae I and II. Specifically, this table illustrates properties such as percentage yield, melting point (m.p.), infrared absorption (IR (cm$^{-1}$)), and mass spectrum molecular ion (M+) for the couplers indicated.

FIGS. 5 and 6 are formulae illustrating the diazo compounds of the present invention, and further indicating the positions of substituents on compounds of Formulae I and II. FIGS. 5A, 6A and 6B represent tabulations of various characteristics of the disazo compounds of Formulae I and II. The table illustrates properties such as percentage yield, melting point (m.p.), infrared absorption (IR cm$^{-1}$)), and the results of elemental analysis for the disazo compounds indicated.

FIGS. 7A, 7B and 8 represent tabulations of xerographic properties of photoconductive imaging members that constitute embodiments of the present invention. These tables provide values for corotron voltage (Corotron (kV)), dark development potential ($V_{ddp}(V)$), dark decay (V/sec), residual potential ($V_R(V)$), and photosensitivity ($E_{0.5\ ddp}$ (ergs/cm$^2$) at 600 nanometers) for imaging members with the disazo compounds indicated containing a supporting substrate of aluminum in FIGS. 7A and 7B, titanized Mylar in FIG. 8, and a hole transport layer of about 60 percent Makrolon polycarbonate resin mixed with about 40 percent N,N'-bis(3- methylphenyl)-1,1'-biphenyl-4,4'-diamine with respect to all the aforementioned Figures. Details concerning the conditions under which these values were obtained are found in Examples V and VI.

The supporting substrate of the imaging members may comprise an insulating material such as an inorganic or organic polymeric material, including Mylar ®, a commercially available polymer; a layer of an organic or inorganic material having a semiconductive surface layer such as indium tin oxide or aluminum arranged thereon; or a conductive material such as aluminum, chromium, nickel, brass or the like. The substrate may be flexible or rigid and may have a number of different configurations, such as a plate, a cylindrical drum, a scroll, an endless flexible belt, and the like. Preferably, the substrate is in the form of an endless flexible belt. In some situations, it may be desirable to coat an anti-curl layer, such as polycarbonate materials commercially available as Makrolon ®, on the back of the substrate, particularly when the substrate is an organic polymeric material.

The thickness of the substrate layer depends on many factors, including economic considerations. Thus, this layer may be of substantial thickness, for example over 100 mils, or of minimal thickness provided that there are no adverse effects on the system. In a preferred embodiment, the thickness of this layer is from about 3 mils to about 10 mils.

The photogenerating layer contains an azo pigment of Formulae I or II. Generally, this layer has a thickness of from about 0.05 micron to about 10 microns or more, and preferably has a thickness of from about 0.1 micron to about 3 microns. The thickness of this layer, however, is dependent primarily upon the photogenerating weight loading, which may vary from about 5 to 100 percent. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, such as the specific azo compound selected, the thicknesses of the other layers, and whether a flexible photoconductive imaging member is desired.

Also, the azo pigments of Formula I illustrated in FIG. 5 may be prepared, for example, by reacting 2-hydroxy-3-naphthoic acid with thionyl chloride to obtain 2-hydroxy-3-naphthoic acid chloride. Subsequently, the formed acid chloride is added to a solution of N,N-diethylaniline and a halo aniline to yield a halo coupler compound. A 5 millimole amount of 2,7-diaminofluoren-9-one is then tetrazotized by an excess amount of a metal nitrite such as sodium nitrite in an aqueous hydrochloric acid solution at from about 0° C. to about 30° C., and the product is reacted with HBF$_4$. An 11 millimole amount of the halo coupler compound previously prepared is then added to the resulting tetrazonium salt in a solution of dimethylformamide at from about 0° C. to about 30° C., followed by the addition of a base, such as sodium acetate in water, to the reaction mixture. The resulting precipitated product is a disazo pigment of Formula I, the specific compound obtained depending on the dihalo aniline selected during the preparation of the coupler compound. For example, 2,3-dichlloroaniline is selected as a reactant to obtain the coupler compound 2-hydroxy-3-naphtho-2',3'-dichloroanilide, which is then used to prepare 2,7-bis(1'azo-2'-hydroxy-3'naphtho-2",3"-dichloroanilide)-fluoren-9-one. The azo pigments are isolated by filtration and purified by repetitive solvent washings, and may be characterized by elemental analysis, melting point, and IR spectroscopy.

The azo pigments of Formula II listed in FIG. 6 may be prepared, for example, by reacting 2-hydroxy-3-naphthoic acid with thionyl chloride to obtain 2-hydroxy-3-naphthoic acid chloride. Subsequently, the formed acid chloride is added to a solution of N,N-diethylaniline, and an appropriately substituted aniline to yield a coupler compound. A 5 millimole amount of 2,7-diaminodibenzothiophene sulfone is then tetrazotized by an excess amount of a metal nitrite such as sodium nitrite in hydrochloric acid at from about 0° C. to about 30° C., and the product is reacted with HBF$_4$. An 11 millimole amount of the coupler compound previously prepared is then added to the resulting tetrazonium salt in a solution of dimethylformamide at from about 0° C. to about 30° C., followed by the addition of a base, such as sodium acetate in water, to the reaction mixture. The resulting precipitated product is a disazo pigment of Formula II, the specific compound obtained depending on the substituents present in the coupler compound. For example, 3,5-difluoroaniline is selected to obtain the coupler compound 2-hydroxy-3-naphtho-3',5'-difluoroanilide, which is then used to prepare 2,7-bis(1'-azo-2'-hydroxy-3'-naphtho-3",5"-difluoroanilide)dibenzothiophene sulfone. The azo pigments are isolated by filtration and purified by repetitive solvent washings, and may be characterized by elemental analysis, melting point, and IR spectroscopy.

The hole transport layer comprises an aryl amine compound dispersed in a resinous binder. Preferred aryl amine compounds include those of the formula:

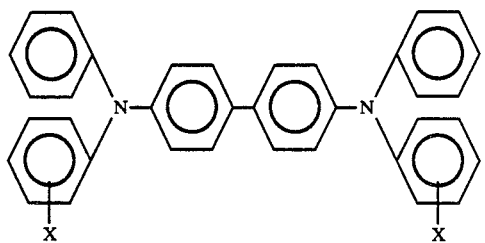

wherein X is selected from the group consisting of alkyl and halogen. Preferably, X is selected from the group consisting of methyl and chloride in either the ortho, meta, or para positions Suitable inactive binder materials for the hole transport layer include highly insulating and transparent resins, and have a resistivity of at least $10^{12}$ ohm-cm to prevent undue dark decay. The insulating resin becomes electrically active when it contains from about 10 to about 75 percent by weight of the substituted N,N,N',N'-tetraphenyl[1,1-biphenyl]4,4'-diamines corresponding to the foregoing formula. Compounds corresponding to the above formula include N,N'-diphenyl-N,N'-bis(alkylphenyl)-[1,1-biphenyl]-4,4'-diamine, wherein alkyl is selected from the group consisting of methyl, such as 2-methyl, 3-methyl and 4-methyl, ethyl, propyl, butyl, hexyl and the like. With halo substitution, the amine is N,N'-diphenyl-N,N'-bis(-halo phenyl)-[1,1'-biphenyl]-4,4'-diamine, wherein halo is 2-chloro, 3-chloro or 4-chloro. Other electrically active small molecules that can be dispersed in the electrically inactive resin to form a layer which will transport holes include bis(4-diethylamino-2-methylphenyl)- phenyl methane, 4',4''-bis(diethylamino)-2',2''-dimethyltriphenyl methane, bis-4-(diethylaminophenyl)phenyl methane, and 4,4'-bis(diethylamino)-2,2'-dimethyltriphenyl methane. Generally, the hole transport layer has a thickness of from about 5 to about 50 microns, and preferably of from about 10 to about 40 microns.

Examples of the highly insulating and transparent resinous components or inactive binder resinous material for the transport layers include materials such as those described in U.S. Pat. No. 3,121,006, the disclosure of which is totally incorporated herein by reference. Specific examples of suitable organic resinous materials include polycarbonates, arcylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Similar binder materials may be selected for the azo photogenerating layer, including those illustrated in U.S. Pat. No. 3,121,006, the disclosure of which is totally incorporated herein by reference. A preferred class of binder material for the azo photogenerating layer is a poly(vinyl acetal).

The photoconductive imaging member may optionally contain a hole blocking layer situated between the supporting substrate and the photogenerating layer. This layer may comprise metal oxides, such as aluminum oxide and the like, or materials such as silanes. The primary purpose of this layer is to prevent hole injection from the substrate during and after charging. Typically, this layer is of a thickness of less than 50 Angstroms, although it may be as thick as 500 Angstroms in some instances.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is of a thickness of less than about 0.6 micron.

Imaging members of the present invention exhibit superior xerographic properties. For example, values for dark development potential ($V_{ddp}$) range from $-730$ to $-980$ volts. Acceptable ranges for dark development potential for the imaging members of the present invention are usually about $-400$ to $-500$ volts, with $-800$ volts being preferred. High dark development potentials permit high contrast potentials, which result in images of high quality with essentially no background development.

The imaging members of the present invention also exhibit acceptable dark decay values, of from $-10$ to $-115$ volts per second. Low dark decay values are necessary for developing high quality images, since dark decay measures the amount of charge that disappears after charging of the photoreceptor, and a large difference in charge between exposed and unexposed areas of the photoreceptor results in images with high contrast. Acceptable values for dark decay vary depending on the design of the imaging apparatus in which the imaging members are contained; dark decay may be as high as $-100$ volts per second, with $-50$ volts per second being excellent, and $-10$ to $-20$ volts per second being preferred.

Residual potential values ($V_R$) for the imaging members of the present invention are also superior, ranging from $-5$ volts to $-20$ volts. Residual potential is a measure of the amount of charge remaining on the imaging member after erasure by exposure to light and prior to imaging. Residual potentials of $-5$ to $-10$ are considered excellent, and values of $-10$ to $-20$ are considered acceptable.

Photosensitivity values ($E_{0.5\ ddp}$ at 600 nanometers) for the imaging members of the present invention are excellent, and range from 2.4 to 11.9 ergs per square centimeter. Acceptable photosensitivity values vary depending on the design of the imaging apparatus in which the imaging members are contained; thus in some instances, values as high as 40 or 50 are acceptable, and values of about 10 are preferred.

The present invention also encompasses a method of generating images with the photoconductive imaging members disclosed herein. The method comprises the steps of generating an electrostatic image on a photoconductive imaging member of the present invention, subsequently developing the electrostatic image, transferring the developed electrostatic image to a suitable substrate, and permanently affixing the transferred image to the substrate. Development of the image may be achieved by a number of methods, such as cascade, touchdown, powder cloud, magnetic brush, and the like. Transfer of the developed image to a substrate may be by any method, including those making use of a corotron or a biased roll. The fixing step may be performed by means of any suitable method, such as flash fusing, heat fusing, pressure fusing, vapor fusing, and the like. Any paper or transparency material used in xerographic copiers and printers may be used as a substrate.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

To 30 grams (0.16 moles) of 2-hydroxy-3-naphthoic acid in 125 milliliters of methylene chloride was added 24 grams of thionyl chloride. The reaction mixture was maintained at reflux under a nitrogen atmosphere. After 4 hours, a dark brown solution of 2-hydroxy-3-naphthoic acid chloride was obtained. The solution was cooled to room temperature, placed in a 125 milliliter pressure equalizing funnel, and added slowly to a 200 milliliter methylene chloride solution of 24 grams of N,N-diethylaniline and 27 grams of 2,3-dichloroaniline (0.16 moles). The mixture was heated to reflux. The reaction was substantially complete after approximately 3 hours; and allowing the reaction to continue for up to 20 hours was not observed to affect the product. Half of the reacting solvent was distilled off and 50 to 100 milliliters of ethanol was introduced. After cooling the mixture to room temperature, the precipitated product was collected by filtration and washed twice with 50 milliliter portions of methanol. The crude product was then recrystallized from a mixture of duimethylformamide and methanol. Yield of the coupler compound 2- hydroxy-3-naphtho-2',3'-dichloroanilide was 37 grams (70 percent). The coupler compound exhibited the following properties:

Melting point: 246° to 248° C. (measured in a capillary melting point apparatus in which the temperature of the oil bath is measured).

IR(KBr): 1651 (Perkin-Elmer FT-IR, Model 1750).

MS (m/z): 331 (M+) (Molecular ion, Varian VG 7035 mass spectrometer).

A disazo pigment was thenn prepared by the tetrazotization of 1.05 grams (5 millimoles) of 2,7-diaminofluoren-9-one by sodium nitrite (1 gram in 2.5 milliliters of water) in 20 milliliters of 18 percent aqueous hydrochloric acid at 0° to 5° C. After the diamine compound went into solution, the mixture was filtered, and 10 milliliters of $HBF_4$ solution (48 to 50 percent by weight) was added to the filtrate, and the yellow precipitate obtained was collected by filtration. After washing the yellow precipitate with water, methanol, and ether and air drying, approximately 1.9 grams of the tetrafluoroborate tetrazonium salt was obtained. The tetrazonium salt was then dissolved in 40 milliliters of cold dimethylformamide. To 250 milliliters of cold dimethylformamide was added 11 millimoles of the coupler compound 2-hydroxy-3-naphtho-2',3'-dichloroanilide prepared as described above, and the resulting solution was then added slowly into the tetrazonium salt solution, which was kept at approximately 5° C. by an ice bath. A solution of 5 grams of sodium acetate in 75 milliliters of water was then added dropwise to the salt solution over a period of approximately 30 minutes. The mixture was stirred at room temperature for 3 to 20 hours. After filtration, the crude product was washed three times with warm 250 milliliter portions of dimethylformamide, washed twice with warm 250 milliliter portions of water, washed once with 250 milliliters of acetone, and washed once with 250 milliliters of ether. The purified 2,7-bis(1'azo-2'-hydroxy-3'naphtho-2",3"-dichloroanilide)fluoren-9-one, a compound encompassed by Formula I, resulted in a yield of 3.7 grams (82 percent).

EXAMPLE II

Other dihalogenated azo pigments of Formula I were prepared by repeating the procedures of Example I, with the exception that 2,3-dichloroaniline was replaced with the appropriate halo aniline during the preparation of the coupler compounds. The following table indicates which coupler compounds were selected to prepare specific disazo compounds of Formula I.

| COUPLER COMPOUND | RESULTING DISAZO COMPOUND |
|---|---|
| 2-hydroxy-3-naphtho-2',3'-dichloroanilide | 2,7-bis(1'azo-2'-hydroxy-3'-naphtho-2",3"-dichloroanilide)fluoren-9-one |
| 2-hydroxy-3-naphtho-2',4'-dichloroanilide | 2,7-bis(1'azo-2'-hydroxy-3'-naphtho-2",4"-dichloroanilide)fluoren-9-one |
| 2-hydroxy-3-naphtho-2',5'-dichloroanilide | 2,7-bis(1'azo-2'-hydroxy-3'-naphtho-2",5"-dichloroanilide)fluoren-9-one |
| 2-hydroxy-3-naphtho-3',5'-dichloroanilide | 2,7-bis(1'azo-2'-hydroxy-3'-naphtho-3",5"-dichloroanilide)fluoren-9-one |
| 2-hydroxy-3-naphtho-3',4'-dichloroanilide | 2,7-bis(1'azo-2'-hydroxy-3'-naphtho-3",4"-dichloroanilide)fluoren-9-one |
| 2-hydroxy-3-naphtho-2',3'-difluoroanilide | 2,7-bis(1'azo-2'-hydroxy-3'-naphtho-2",3"-difluoroanilide)fluoren-9-one |
| 2-hydroxy-3-naphtho-2',4'-difluoroanilide | 2,7-bis(1'azo-2'-hydroxy-3'-naphtho-2",4"-difluoroanilide)fluoren-9-one |
| 2-hydroxy-3-naphtho-2',5'-difluoroanilide | 2,7-bis(1'azo-2'-hydroxy-3'-naphtho-2",5"-difluoroanilide)fluoren-9-one |
| 2-hydroxy-3-naphtho-3',5'-difluoroanilide | 2,7-bis(1'azo-2'-hydroxy-3'-naphtho-3",5"-difluoroanilide)fluoren-9-one |
| 2-hydroxy-3-naphtho-3',4'-difluoroanilide | 2,7-bis(1'azo-2'-hydroxy-3'-naphtho-3",4"-difluoroanilide)fluoren-9-one |

The coupler compound 2-hydroxy-3-naphtho-2',5'-dichloroanilide is commercially available from Aldrich Chemical Company, and was not prepared according to the method of Example II. Yields and properties of the coupler compounds and the resulting disazo compounds are illustrated in the tables in FIGS. 4 and 5A, respectively. The disazo compounds were not observed to melt at temperatures as high as 300° C. after 10 minutes, at which time the test was terminated.

EXAMPLE III

The coupler compound 2-hydroxy-3-naphtho-3',5'-difluoroanilide was prepared according to the method set forth in Example I. A disazo pigment was then prepared by the tetrazotization of 1.23 grams (5 millimoles) of 2,7-diaminodibenzothiophene sulfone by sodium nitrite (1 gram in 2.5 milliliters of water) in 20 milliliters of 18 percent aqueous hydrochloric acid at 0° to 5° C. After the diamine compound went into solution, the mixture was filtered and 10 milliliters of $HBF_4$ (48 to 50 percent by weight) solution was added to the filtrate, and the yellow precipitate obtained was collected by filtration. After washing the yellow precipitate with cold water, methanol, and ether and air drying, approximately 2.2 grams of the tetrafluoroborate tetrazonium salt was obtained. The tetrazonium salt was then dissolved in 40 milliliters of cold dimethylformamide. To 250 milliliters of cold dimethylformamide was added 3.3 grams (11 millimoles) of the coupler compound 2-hydroxy-3-naphtho-3',5'-difluoroanilide prepared as described above, and the resulting solution was then added slowly into the tetrazonium salt solution. A solution of 5 grams of sodium acetate in 75 milliliters of water was then added dropwise to the salt solution over a period of approximately 30 minutes. The mixture was stirred at room temperature for 3 to 20 hours. After filtration, the crude product was washed three times with warm 250 milliliter portions of dimethylformamide, washed twice with warm 250 milliliter portions of water, washed once with 250 milliliters of acetone, and washed once with 250 milliliters of ether. The purified 2,7-bis(1'-azo-2'-hydroxy-3'-naphtho-3",5"-difluoroanilide)dibenzothiophene sulfone, a compound encompassed by Formula II, resulted in a yield of 3.2 grams (74 percent).

EXAMPLE IV

Other azo pigments of Formula II were prepared by repeating the procedures of Example III with the exception that the coupler compound was replaced with another appropriately substituted coupler compound. The following table indicates the coupler compounds used to prepare the disazo compounds of Formula II. Yields and the specific disazo pigments obtained are illustrated in the tables in FIGS. 6A and 6B. The compounds were not observed to melt at temperatures as high as 300° C. after 10 minutes, at which time the test was terminated.

| COUPLER COMPOUND | RESULTING DISAZO COMPOUND |
|---|---|
| 2-hydroxy-3-naphtho-3',5'-dichloroanilide | 2,7-bis(1'azo-2'-hydroxy-3'-naphtho-3",5"-dichloroanilide)dibenzothiophene sulfone |
| 2-hydroxy-3-naphtho-3',4'-dichloroanilide | 2,7-bis(1'azo-2'-hydroxy-3'-naphtho-3",4"-dichloroanilide)dibenzothiophene sulfone |
| 2-hydroxy-3-naphtho-2',5'-dichloroanilide | 2,7-bis(1'azo-2'-hydroxy-3'-naphtho-2",5"-dichloroanilide)dibenzothiophene sulfone |
| 2-hydroxy-3-naphtho-2',4'-dichloroanilide | 2,7-bis(1'azo-2'-hydroxy-3'-naphtho-2",4"-dichloroanilide)dibenzothiophene sulfone |
| 2-hydroxy-3-naphtho-2',3'-dichloroanilide | 2,7-bis(1'azo-2'-hydroxy-3'-naphtho-2",3"-dichloroanilide)dibenzothiophene sulfone |
| 2-hydroxy-3-naphtho-3',5'-difluoroanilide | 2,7-bis(1'azo-2'-hydroxy-3'-naphtho-3",5"-difluoroanilide)dibenzothiophene sulfone |
| 2-hydroxy-3-naphtho-3',4'-difluoroanilide | 2,7-bis(1'azo-2'-hydroxy-3'-naphtho-3",4"-difluoroanilide)dibenzothiophene sulfone |
| 2-hydroxy-3-naphtho-2',5'-difluoroanilide | 2,7-bis(1'azo-2'-hydroxy-3'-naphtho-2",5"-difluoroanilide)dibenzothiophene sulfone |
| 2-hydroxy-3-naphtho-2',4'-difluoroanilide | 2,7-bis(1'azo-2'-hydroxy-3'-naphtho-2",4"-difluoroanilide)dibenzothiophene sulfone |
| 2-hydroxy-3-naphtho-2',3'-difluoroanilide | 2,7-bis(1'azo-2'-hydroxy-3'-naphtho-2",3"-difluoroanilide)dibenzothiophene sulfone |
| 2-hydroxy-3-naphtho-2'-fluoroanilide | 2,7-bis(1'azo-2'-hydroxy-3'-naphtho-2"-fluoroanilide)dibenzothiophene sulfone |
| 2-hydroxy-3-naphtho-3'-fluoroanilide | 2,7-bis(1'azo-2'-hydroxy-3'-naphtho-3"-fluoroanilide)dibenzothiophene sulfone |
| 2-hydroxy-3-naphtho-4'-fluoroanilide | 2,7-bis(1'azo-2'-hydroxy-3'-naphtho-4"-fluoroanilide)dibenzothiophene sulfone |
| 2-hydroxy-3-naphtho-3'-trifluoromethylanilide | 2,7-bis(1'azo-2'-hydroxy-3'-naphtho-3"-trifluoromethylanilide)dibenzothiophene sulfone |

EXAMPLE V

A photoconductive imaging member was prepared containing as the photogenerating compound 2,7-bis(1'-azo-2'-hydroxy-3'-naphtho-2",3"-dichloroanilide)fluoren-9-one obtained by the process of Example I. A photogenerating pigment dispersion was prepared by first dissolving 52.8 milligrams of poly(vinyl formal) in 10 milliliters of tetrahydrofuran in a 1 ounce brown bottle. To the polymer solution were added 211.2 milligrams of the 2,7-bis(1'azo-2'-hydroxy-3'naphtho-2",3"-dichloroanilide)fluoren-9-one, and approximately 90 grams of steel shot (⅛ inch diameter, #302 grade). The brown bottle was then placed in a Red Devil Paint Conditioner (Model 5100X) and shaken for 30 minutes. A dispersion resulted, which was coated onto a 0.006 inch thick 7.5 inch by 10 inch aluminum substrate by using a Gardner Mechanical Drive Film Application with a 6 inch wide Bird Film Applicator (0.5 mil wet gap) inside a humidity controlled glove box. The relative humidity inside the glove box was controlled by dry air and was maintained at less than 25 percent at room temperature. A photogenerating layer resulted and was air dried for approximately 30 minutes, and vacuum dried at 100° C. for approximately 1 hour before further coating. The thickness of the photogenerating layer was found to be approximately 0.5 micron as estimated from TEM micrographs.

A transport layer composed of about 60 percent Makrolon ®, polycarbonate resin, available from Larbensabricken Bayer AG, mixed with about 40 percent N,N'-bis(3-methylphenyl)-1,1'-biphenyl-4,4'-diamine was then formulated. A solution comprising 4.2 grams of Makrolon ®, 2.8 grams of the diamine, and 31 milliliters of methylene chloride was placed in an amber bottle and dissolved. The charge transport layer was obtained by coating the solution onto the above azo photogenerating layer using a 5 mil wet gap Bird Film Applicator to a thickness of approximately 27 microns. A photoconductive imaging member resulted and was air dried for 1 hour, and vacuum dried for 6 to 20 hours.

The above procedure was repeated wherein the photogenerating layer contained the disazo compounds listed in sequence in FIGS. 7A and 7B, and thereafter photoconductive imaging members containing the disazo compounds of Formulae I and II shown in FIG. 7 were prepared. The imaging members exhibited the xerographic properties summarized in the table in FIGS. 7A and 7B. After testing for approximately 30,000 imaging cycles, all the above prepared imaging members were observed to have undergone an insignificant amount of deterioration with respect to xerographic properties, and it is believed that the imaging members could be used for as many as 50,000 to 100,000 imaging cycles.

EXAMPLE VI

Six photoconductive imaging members containing in the photogenerating layer the disazo compounds listed in sequence in FIG. 8 were prepared according to the procedures set forth in Example V with the exception that titanized Mylar ® substrates having thicknesses of 3 mils were used in place of aluminum substrates; 52.8 grams of the specified binder polymer were selected in place of the poly(vinyl formal) binder. The xerographic properties of these imaging members are summarized in the table in FIG. 8.

These examples are illustrative in nature and are not intended to limit the scope of the invention. Other embodiments of the present invention may occur to those skilled in the art, and these are included within the scope of the claims.

What is claimed is:

1. A photoconductive imaging member comprising a supporting substrate, a hole transport layer, and a photogenerating layer comprising disazo compounds selected from the group consisting of:

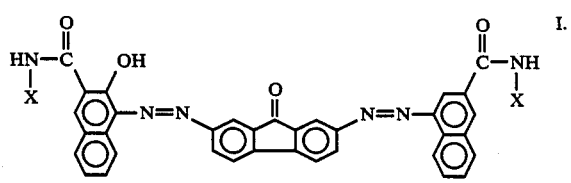

wherein X is selected from the group consisting of:

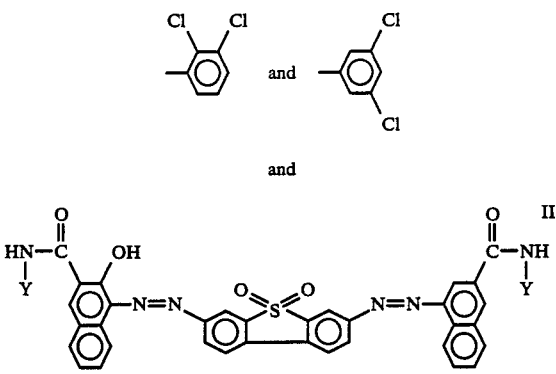

and

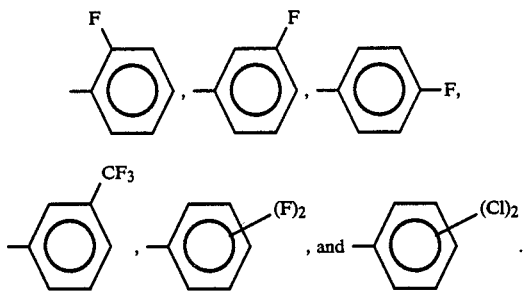

wherein Y is selected from the group consisting of:

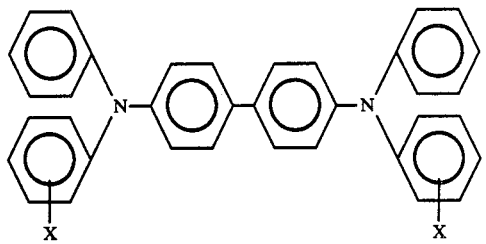

2. A photoconductive imaging member in accordance with claim 1 wherein the photogenerating layer is situated between the supporting substrate and the hole transport layer.

3. A photoconductive imaging member in accordance with claim 1 wherein the hole transport layer is situated between the supporting substrate and the photogenerating layer.

4. A photoconductive imaging member in accordance with claim 1 wherein the photoconductive imaging member includes therein a metal oxide hole blocking layer situated between the supporting substrate and the photogenerating layer.

5. A photoconductive imaging member in accordance with claim 4 wherein the metal oxide is aluminum oxide.

6. A photoconductive imaging member in accordance with claim 4 wherein the metal oxide hole blocking layer has a thickness of less than about 50 Angstroms.

7. A photoconductive imaging member in accordance with claim 4 wherein the photoconductive imaging member includes therein an adhesive interface layer situated between the supporting substrate and the metal oxide hole blocking layer.

8. A photoconductive imaging member in accordance with claim 7 wherein the adhesive interface layer comprises a polymeric material selected from the group consisting of polyester, polyvinylbutyral, and polyvinyl pyrrolidone.

9. A photoconductive imaging member in accordance with claim 7 wherein the adhesive interface layer has a thickness of less than about 0.6 micron.

10. A photoconductive imaging member in accordance with claim 1 wherein the supporting substrate is a metal.

11. A photoconductive imaging member in accordance with claim 10 wherein the metal is aluminum.

12. A photoconductive imaging member in accordance with claim 1 wherein the supporting substrate is an organic polymeric composition.

13. A photoconductive imaging member in accordance with claim 1 wherein the supporting substrate has a thickness of from about 3 to about 100 mils.

14. A photoconductive imaging member in accordance with claim 1 wherein the supporting substrate has a thickness of from about 3 to about 10 mils.

15. A photoconductive imaging member in accordance with claim 1 wherein the photogenerating layer has a thickness of from about 0.05 to about 10 microns.

16. A photoconductive imaging member in accordance with claim 1 wherein the photogenerating layer has a thickness of from about 0.1 to about 3 microns.

17. A photoconductive imaging member in accordance with claim 1 wherein the hole transport layer has a thickness of from about 5 to about 50 microns.

18. A photoconductive imaging member in accordance with claim 1 wherein the azo photogenerating compound in dispersed in a resinous binder in an amount of from about 5 percent by weight to about 95 percent by weight.

19. A photoconductive imaging member in accordance with claim 18 wherein the resinous binder is a polyester, polyvinyl butyral, a polycarbonate, or polyvinyl formal.

20. A photoconductive imaging member in accordance with claim 1 wherein the hole transport layer comprises an aryl amine compound.

21. A photoconductive imaging member in accordance with claim 20 wherein the aryl amine comprises molecules of the formula:

dispersed in a highly insulating and transparent organic resinous binder wherein X is selected from the group consisting of alkyl and halogen.

22. A photoconductive imaging member in accordance with claim 21 wherein X is selected from the group consisting of ortho (CH$_3$), meta(CH$_3$),para(CH$_3$),ortho(Cl),meta(Cl), and para(Cl).

23. A photoconductive imaging member in accordance with claim 21 wherein the resinous binder is a polyester, polyvinyl butyral, a polycarbonate, or polyvinyl formal.

24. A photoconductive imaging member in accordance with claim 1 wherein the disazo compound is 2,7-bis(1'-azo-2'-hydroxy-3'-naphtho-2",3"-dichloroanilide)fluoren-9-one.

25. A photoconductive imaging member in accordance with claim 1 wherein the disazo compound is 2,7-bis(1'-azo-2'-hydroxy-3'-naphtho-3",5"-dichloroanilide)fluoren-9-one.

26. A photoconductive imaging member in accordance with claim 1 wherein the disazo compound is 2,7-bis(1'-azo-2'-hydroxy-3'-naphtho-2"-fluoroanilide)-dibenzothiophenesulfone.

27. A photoconductive imaging member in accordance with claim 1 wherein the disazo compound is 2,7-bis(1'-azo-2'-hydroxy-3'-naphtho-3"-fluoroanilide)-dibenzothiophenesulfone.

28. A photoconductive imaging member in accordance with claim 1 wherein the disazo compound is 2,7-bis(1'-azo-2'-hydroxy-3'-naphtho-4'-fluoroanilide)-dibenzothiophenesulfone.

29. A photoconductive imaging member in accordance with claim 1 wherein the disazo compound is 2,7-bis(1'-azo-2'-hydroxy-3'-naphtho-2",5"-difluoroanilide)dibenzothiophenesulfone.

30. A photoconductive imaging member in accordance with claim 1 wherein the disazo compound is 2,7-bis(1'-azo-2'-hydroxy-3'-naphtho-2",4"-difluoroanilide)dibenzothiophenesulfone.

31. A photoconductive imaging member in accordance with claim 1 wherein the disazo compound is 2,7-bis(1'-azo-2'-hydroxy-3'-naphtho-3",5"-difluoroanilide)dibenzothiophenesulfone.

32. A photoconductive imaging member in accordance with claim 1 wherein the disazo compound is 2,7-bis(1'-azo-2'-hydroxy-3'-naphtho-3"-trifluoromethylanilide)dibenzothiophenesulfone.

33. A photoconductive imaging member in accordance with claim 1 wherein the imaging member exhibits a dark development potential of from about $-730$ to about $-980$ volts.

34. A photoconductive imaging member in accordance with claim 1 wherein the imaging member exhibits a dark decay of from about $-10$ to about $-115$ volts per second.

35. A photoconductive imaging member in accordance with claim 1 wherein the imaging member exhibits a residual potential of from about $-5$ to about $-20$ volts.

36. A photoconductive imaging member in accordance with claim 1 wherein the imaging member exhibits a photosensitivity of from about 2.4 to about 11.9 ergs/cm$^2$ at 600 nanometers.

37. A photoconductive imaging member in accordance with claim 1 wherein the imaging member exhibits a dark development potential of from about $-820$ to about $-980$ volts, a dark decay of from about $-10$ to about $-55$ volts per second, a residual potential of from about $-5$ to about $-20$ volts, and a photosensitivity of from about 2.4 to about 11.9 ergs/cm$^2$ at 600 nanometers.

38. A method of imaging which comprises the steps of:
  (a) generating an electrostatic image on the photoconductive imaging member of claim 1;
  (b) subsequently developing the electrostatic image;
  (c) transferring the developed electrostatic image to a suitable substrate; and
  (d) permanently affixing the transferred image to the substrate.

39. A method of imaging in accordance with claim 38 wherein the electrostatic image is developed by cascade, touchdown, powder cloud, or magnetic brush methods.

40. A method of imaging in accordance with claim 38 wherein the developed electrostatic image is transferred to a substrate by means of a corotron or a biased roll.

41. A method of imaging in accordance with claim 38 wherein the substrate is paper.

42. A method of imaging in accordance with claim 38 wherein the substrate is a transparency material.

* * * * *